(12) United States Patent
Schröder et al.

(10) Patent No.: US 6,234,525 B1
(45) Date of Patent: May 22, 2001

(54) DRIVER RESTRAINT DEVICE FOR AN INDUSTRIAL TRUCK

(75) Inventors: Werner-Georg Schröder, Grossostheim; Caspar Tügel, Hamburg, both of (DE)

(73) Assignee: Still GmbH (DE)

( * ) Notice: Subject to any disclaimer, the term of this patent is extended or adjusted under 35 U.S.C. 154(b) by 0 days.

(21) Appl. No.: 09/067,123

(22) Filed: Apr. 27, 1998

(30) Foreign Application Priority Data

Apr. 28, 1997 (DE) ................................. 197 17 895

(51) Int. Cl.⁷ ................................. B60R 21/02
(52) U.S. Cl. .................. 280/748; 280/749; 297/487
(58) Field of Search .................. 280/748, 749, 280/801.1, 801.2, 807; 297/487, 468, 483

(56) References Cited

U.S. PATENT DOCUMENTS

| | | | |
|---|---|---|---|
| 3,623,768 | 11/1971 | Capener et al. | 297/390 |
| 3,859,625 | * 1/1975 | Eggert, Jr. | 340/52 |
| 4,244,601 | * 1/1981 | Nilsson | 280/805 |
| 4,537,446 | 8/1985 | Roney et al. | 297/464 |
| 4,632,208 | * 12/1986 | Takayama et al. | 180/271 |
| 5,062,662 | * 11/1991 | Cameron | 280/733 |
| 5,286,091 | * 2/1994 | Busch | 297/487 |

FOREIGN PATENT DOCUMENTS

| | | |
|---|---|---|
| 2163451 | 7/1973 | (DE) . |
| 3426432 | 2/1985 | (DE) . |
| 2277869 | 11/1994 | (GB) . |
| 4315824 | 11/1994 | (DE) . |
| 07002055 | 1/1995 | (JP) . |

* cited by examiner

*Primary Examiner*—J. J. Swann
*Assistant Examiner*—James S. McClellan
(74) *Attorney, Agent, or Firm*—Webb Ziesenheim Logsdon Orkin & Hanson, P.C.

(57) ABSTRACT

The object of the invention is a driver restraint device for an industrial truck, whereby the driver restraint device has a pivoting bar. The invention teaches that the bar can be pivoted by an operator as desired between an inoperative position and a restraining position, and can be locked in the restraining position and unlocked from the restraining position. In one configuration of the invention, there is at least one control element and/or at least one indicator or display element on the bar. In an additional configuration, a parking brake of the industrial truck can be released as a function of the rotational position of the bar.

7 Claims, 1 Drawing Sheet

DRIVER RESTRAINT DEVICE FOR AN INDUSTRIAL TRUCK

BACKGROUND OF THE INVENTION

This invention relates generally to a driver restraint device for an industrial truck and, more particularly, to a driver restraint device having a pivoting bar.

Driver restraint devices of this type are available in models in which a restraint bar is automatically placed around the driver's torso. Restraining bars of this type are not readily accepted by the drivers of industrial trucks because they severely restrict the driver's freedom of movement when the driver is seated in the driver's seat, and in certain models, such devices even interfere with the driver's entry into and exit from the industrial truck.

Alternatives proposed in the prior art include safety belts, but these belts must be connected by the driver on his own initiative. This connection process is time-consuming and also requires the driver to perform some ergonomically uncomfortable movements. Consequently, the safety belts which are installed on vehicles are frequently not used by the drivers.

An object of this invention is to make available a driver restraint device which, in the event of an accident, and in particular in the event the industrial truck tips over, can keep the driver in the driver's seat. It is a further an object of the invention to provide a restraint device which does not adversely affect the driver's comfort during normal operation of the industrial truck.

SUMMARY OF THE INVENTION

The invention teaches that these objects can be accomplished by a device in which the bar can be moved by an operator as desired between an inoperative position and a restraint position, and can be locked in the restraint position and released from the restraint position. A bar which can be moved by the operator as desired interferes with the driver only to a very limited extent, because the bar is in an inoperative position when the driver enters and exits the vehicle. If, under certain operating conditions, the driver requires a particularly high degree of freedom of movement, he himself can move the bar into the inoperative position. On the other hand, only one single, manual operation is necessary to move the bar into its restraining position and to lock it in this position. For these reasons, the driver restraint device of the invention is readily accepted by drivers.

In one advantageous embodiment, the driver restraint device has a single pivoting bar. Therefore the driver need only move a single component to actuate the driver restraint device, for which only one single, manual operation is necessary.

One particular advantage of the invention is that the bar can be pivoted around an axis of rotation which is substantially vertical or inclined slightly from the vertical axis.

The axis of rotation is advantageously located laterally, substantially adjacent to the driver's seat. In the inoperative position, the bar is therefore located laterally next to the driver's seat. The bar is pivoted around the axis of rotation into its restraining position, whereby it is then located in the vicinity of the driver's torso or lap.

In one particularly advantageous configuration of the invention, the bar provides a means to hold the driver in the driver's seat. The bar is thereby designed so that the bar, when it is locked in the restraining position, keeps the driver in the driver's seat if the industrial truck tips over, in which case the driver's body is supported directly on the bar.

In an additional advantageous embodiment of the invention, a belt is connected to the bar and provides a means to keep the driver in the driver's seat. The belt is thereby realized, for example, in the form of a lap belt which is automatically connected when the restraint bar is pivoted into the restraining position. If the industrial truck tips over, the driver is held in the driver's seat by the belt, whereby the driver's body is supported primarily on the belt.

In one advantageous refinement of the invention, an air bag is connected to the bar.

In an additional advantageous refinement of the invention, at least one control element and/or at least one indicator or display element is located on the bar. The control elements may control movement of the industrial truck or a lifting device carried on the industrial truck and the indicator or display elements may show the status of various aspects of the truck or the lifting device, such as speed, fluid pressure, etc. When the bar is in the restraining position, the control elements are optimally accessible for the driver sitting in the driver's seat, and the indicator or display elements are optimally visible. The installation of these elements on the bar provides the driver with a particular incentive to move the bar into the restraining position before starting the industrial truck.

It is also appropriate if the parking brake of the industrial truck can be released as a function of the position of the bar. When the bar is in the inoperative position, the parking brake is always activated. To release the parking brake, the driver must move the bar into the restraining position. This requirement guarantees that the driver restraint device will always be active when the industrial truck is being driven.

Additional advantages and configurations of the invention are explained in greater detail below, with reference to the exemplary embodiments which are illustrated in the accompanying figures. A complete understanding of the invention will be obtained from the following description when taken in connection with the accompanying drawing figures wherein like reference characters identify like parts throughout.

DESCRIPTION OF THE PREFERRED EMBODIMENTS

Figure 1:
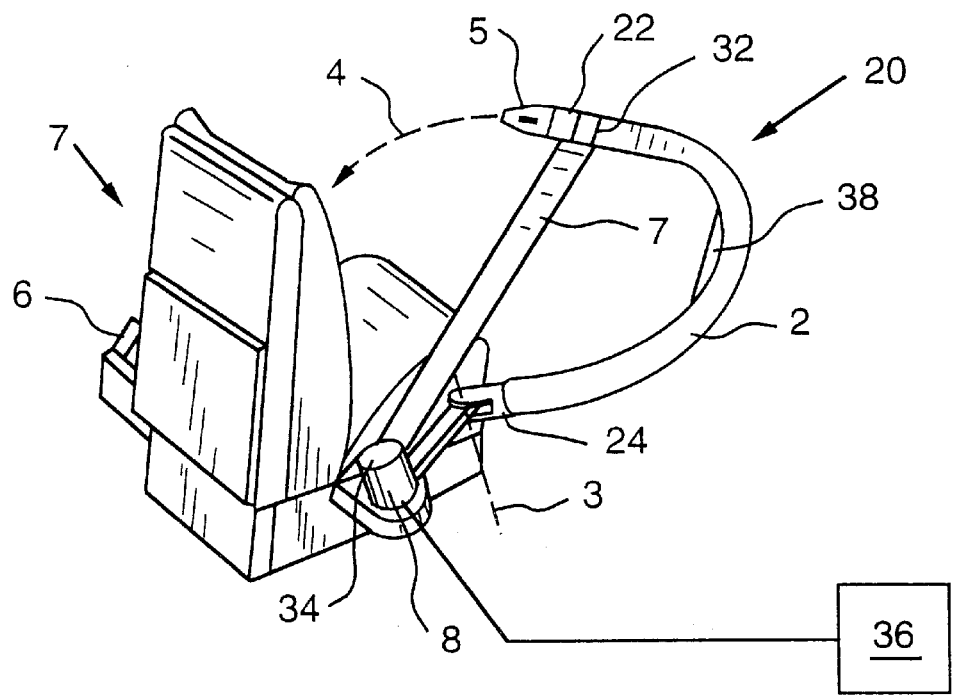
FIG. 1 shows a driver restraint device according to the invention with a bar and a belt.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is to be understood that the specific devices and processes illustrated in the attached drawings and described in the following specification, are simply exemplary embodiments of the invention. Hence, specific dimensions and other physical characteristics related to the embodiments disclosed herein are not to be considered as limiting.

FIG. 1 shows a driver restraint device 20 according to the invention connected to a driver's seat 1. The driver's seat 1 may be located in the driver's compartment of a conventional industrial truck in conventional manner. A restraint bar 2 is shown in an open or inoperative position. The bar 2 has a first end 22 and a second end 24. The second end 24 is pivotally connected to a pivot mechanism 30 such that the bar 2 can be pivoted around a substantially vertical axis 3 in the direction indicated by the arrow 4 into a closed or restraining position. On the first end 22 of the bar 2 remote from the axis 3 there is a latch 5 which can be reversibly locked in a corresponding lock 6 located on or adjacent the driver's seat 1 on a side opposite the pivot mechanism 30. To release the latch 5 from the lock 6, the driver can actuate a conventional switch (not shown) which is easily accessible for the driver.

A belt 7 is connected to the bar 2. As will be understood from FIG. 1, when the bar 2 is in the restraining position, the belt 7 is placed around the driver's lap area. In the vicinity of the axis 3 there is a conventional retractor 8. One end 32 of the belt 7 is attached to the bar 2 and the other end 34 is connected to the retractor 8. Thus, the retractor 8 always keeps the belt 7 taut by means of a spring force. The retractor 8 is preferably a conventional, commercially available component equipped with a conventional locking device which is known in the prior art. In the event of a strong acceleration or a high angle of inclination of the industrial truck, the locking device locks the belt 7 in the retractor 8, so that the driver is held in the driver's seat 1. As shown in FIG. 1, the restraint device 20 may be connected either electronically or mechanically to the parking brake 36 of the industrial truck such that the parking brake 36 is engaged when the bar 2 is rotated to the open or inoperative position and released when the bar 2 is moved to the closed position. A conventional air bag 38 may be located on the bar.

Figure 2:
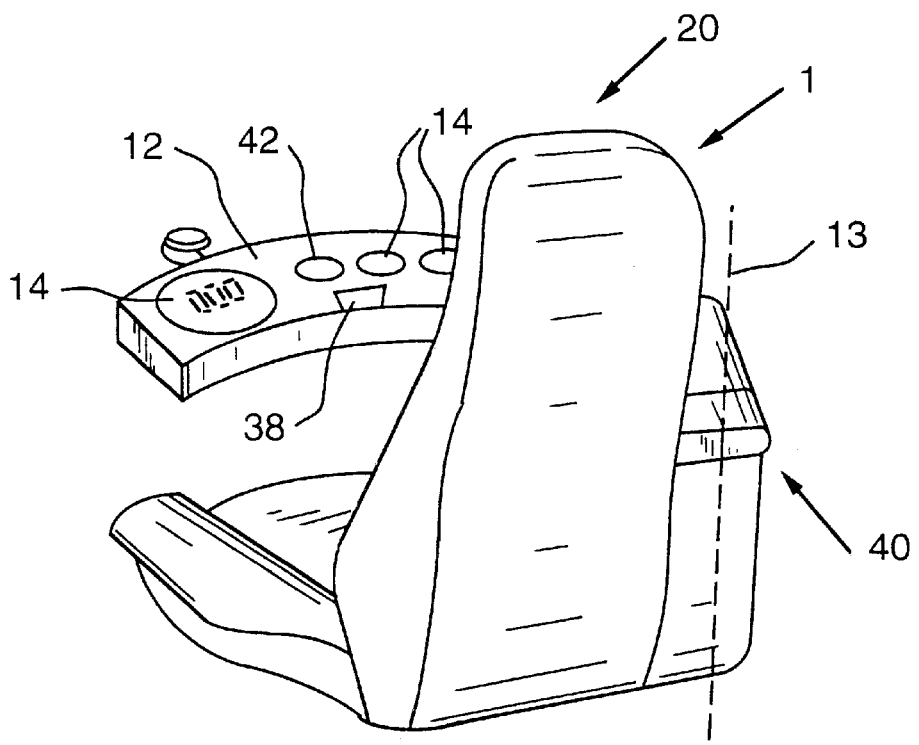
FIG. 2 shows a driver restraint device according to the invention with a bar which has control elements.

FIG. 2 illustrates an additional configuration of the driver restraint device 20 according to the invention. In this embodiment, a bar 12, which is shown in the restraining position, is connected to a pivot mechanism 40 such that the bar 12 can be pivoted around a vertical axis 13 from a closed or restraining position as shown in FIG. 2 to an open or inoperative position similar to that of the bar 2 shown in FIG. 1. In this embodiment, the bar 12 is shaped so that the driver is held in the driver's seat by the bar 12 itself, which may be locked in the restraining position, for example by a conventional locking device attached to the pivot mechanism 40. On the bar 12 there may be located a variety of control elements 14, for example a steering wheel and control knobs for controlling the operation of the industrial truck or a lifting device attached thereto. Additionally, indicator or display elements 42 may be located on the bar 12 to show the status of various truck or lifting device systems. Further, a conventional air bag 38 may be attached to the bar 12. When the bar 12 is in the restraining position, these control elements 14 and display elements 42 are in the optimal position with respect to the driver. To enter and exit the industrial truck, the driver manually pivots the bar 12 around the axis 13 into its inoperative position, whereby the bar 12 does not interfere with access to the driver's seat.

It will readily be appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting as to the scope of the invention which is to be given the full breadth of the appended claims and any and all equivalents thereof.

We claim:

1. A driver restraint device for an industrial truck, comprising:

a bar pivotally mounted on the industrial truck, wherein the bar is movable by a driver as desired between an inoperative position and a restraining position and wherein the bar is configured to be locked in and released from the restraining position by the driver, wherein the restraint device is connected to a parking brake of the industrial truck and the parking brake is released as a function of the pivoting position of the bar.

2. A driver restraint device for an industrial truck having a driver's seat, the restraint device comprising:

a pivot mechanism located substantially adjacent the driver's seat;

a restraint bar having a first end and a second end, with the second end of the restraint bar pivotally connected to the pivot mechanism such that the restraint bar is movable from an open position to a closed position;

a belt having a first end and a second end; and a belt retractor, wherein the first end of the belt is attached to the restraint bar, the second end of the belt is carried on the belt retractor and the belt retractor is located substantially adjacent the driver's seat such that when the restraint bar is in the closed position, the belt is placed around the driver's lap area to hold the driver in the driver's seat.

3. The restraint device as claimed in claim 2, including a lock mechanism located substantially adjacent the driver's seat on a side of the driver's seat opposite the pivot mechanism, wherein the restraint bar includes a latch located on the first end of the restraint bar, the latch configured to reversibly engage the lock mechanism when the restraint bar is moved to the closed position.

4. The restraint device as claimed in claim 2, wherein the restraint bar is substantially arcuate.

5. The restraint device as claimed in claim 2, including control elements or display elements located on the restraint bar.

6. The restraint device as claimed in claim 2, including an air bag located on the restraint bar.

7. A driver restraint device for an industrial truck having a driver's seat, the restraint device comprising:

a pivot mechanism located substantially adjacent the driver's seat; and a restraint bar having a first end and a second end, with the second end of the restraint bar pivotally connected to the pivot mechanism such that the restraint bar is movable from an open position to a closed position, wherein the restraint device is connected to a parking brake of the industrial truck such that the parking brake is disengaged when the restraint bar is in the closed position and the parking brake is engaged when the restraint bar is in the open position.

* * * * *